United States Patent [19]

Toth et al.

[11] 4,048,466
[45] Sept. 13, 1977

[54] METHOD OF MANUFACTURING AXLE HOUSINGS WITH HOLLOW AXLES

[75] Inventors: László Tóth; János Schirhuber; Kálmán Prépost; András Tassi, all of Gyor, Hungary

[73] Assignee: Magyar Vagon- es Gepgyar, Gyor, Hungary

[21] Appl. No.: 629,228

[22] Filed: Nov. 6, 1975

[30] Foreign Application Priority Data

Nov. 23, 1974 Hungary .............................. MA 2620

[51] Int. Cl.² .............................................. B23K 9/00
[52] U.S. Cl. ............................................ 219/121 EM
[58] Field of Search ................ 219/121 EB, 121 EM, 219/121 L, 121 LM; 74/607; 29/463, 469

[56] References Cited

U.S. PATENT DOCUMENTS

| 2,433,630 | 12/1947 | Sherman | 29/463 X |
| 3,213,531 | 10/1965 | Wylie | 29/463 |
| 3,394,610 | 7/1968 | Szodfridt | 74/607 X |
| 3,518,400 | 6/1970 | Gallivan | 219/121 EM |
| 3,673,888 | 7/1972 | Moll et al. | 29/463 X |
| 3,715,935 | 2/1973 | Ebey | 74/607 |
| 3,793,703 | 2/1974 | Winkler et al. | 74/607 |

*Primary Examiner*—J. V. Truhe
*Assistant Examiner*—Fred E. Bell
*Attorney, Agent, or Firm*—Young & Thompson

[57] ABSTRACT

Welded axle housings with hollow axles are manufactured by providing the edges of the axle housing with beadings and finishing the fitting and abutment surfaces thereof as well as of the hollow axles, assembling the axle housing and the hollow axles, clamping in the assembly and connecting its parts by electron beam welding along frontal abutment faces on said beadings.

1 Claim, 2 Drawing Figures

METHOD OF MANUFACTURING AXLE HOUSINGS WITH HOLLOW AXLES

This invention relates to a method of manufacturing axle housings with hollow axles.

It is known to manufacture axle housings with hollow axles in a manner in which the hollow axles with their flanges for receiving brake equipment are connected to the extremities of an axle housing by means of welding. Finishing of the various parts is carried out after welding. However, since welding is effected by means of apparatus in which the work pieces have to be clamped in exact positions, on their wings axle housings have to be provided with machine guiding surfaces whereby the wall thickness of a work piece and, consequently, its welding surface areas considerably decrease.

In addition, hollow axles to be connected by means of welding are liable to warping caused by heat generated during welding and, therefore, they may be finished only after welding has taken place which requires special machining technology and special machine tools as well.

Welded parts may, in the case of conventional arc welding in the presence of a carbon dioxide protective atmosphere, entail fatigue cracks.

The main object of the present invention is to obviate such deficiencies and to provide a method of welding for the manufacture of axle housings with hollow axles intended for use in connection in land vehicles with which cutting of parts may be finished prior to welding and in which welding does not entail fatigue cracks. Thus, the invention aims at a quick and local welding along a well defined and suitably extended abutting face without the necessity of increasing the wall thickness of the axle housing.

It has been found that such welding may be obtained by means of a combination of method steps.

An abutting face required for a reliable connection of axle housings and hollow axles can be obtained with usual wall thicknesses by forming beadings on free ends of the axle housing, such beadings offering sufficient space for fitting the hollow axles in the axle housing and for obtaining abutting faces necessary for good welding. Fatigue cracks due to welding will be avoided by employing electron beam welding which is suitable to form a welded connection in a very narrow area without perceptibly influencing the material structure in neighbouring areas of the material. According to experiments, axle housings with hollow axles manufactured in the aforesaid manner have been of stable shape so that no machining was necessary after welding. This is — besides the advantageous properties of electron beam welding — obviously due also to increased wall thicknesses at welded areas obtained by means of beadings.

Thus, it will be appreciated that the invention is concerned with a method of manufacturing axle housings with hollow axles with which the axle housing has, in a manner known per se, the hollow axles welded to it. The invention proper consists in the employment of the steps of:

forming a beaded edge on each side of the axle housing;

machining both the axle housing and the hollow axles so as to have mutually abutting front surfaces;

fitting the hollow axles each in one of the beaded edges of the axle housing along said mutually abutting front surfaces;

clamping the axle housing with the fitted in hollow axles in a clamping device;

and connecting the hollow axles with the axle housing along said mutually abutting front surfaces by means of electron beam welding.

In a preferred form of the invention the axle housing is made of pressed sheet metal and the beadings at the edges of the axle housing are obtained by means of plastic deformation of the sheet metal simultaneously with pressing which results in a very simple method of manufacture.

Further details of the invention will be described with reference to the accompanying drawings, in which.

Figure 1:
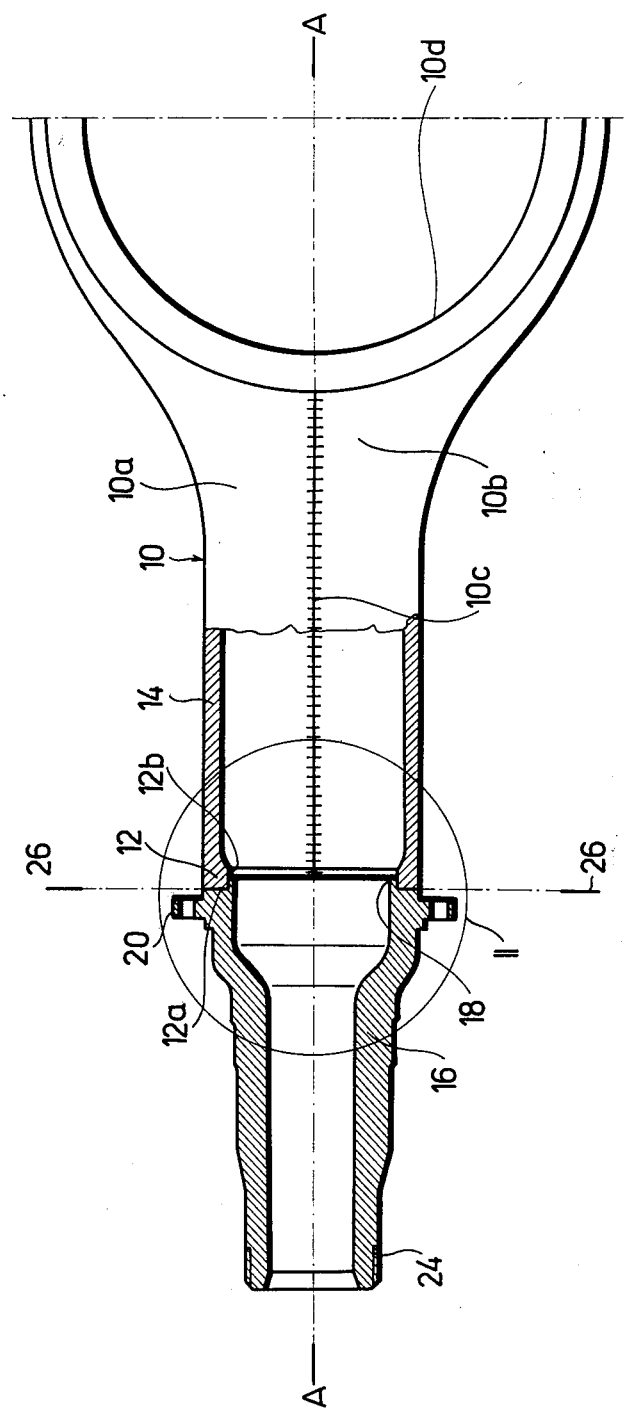
FIG. 1 is a longitudinal sectional view of a half of an exemplified embodiment of an axle housing with hollow axles prepared by means of the method according to the invention.
Figure 2:
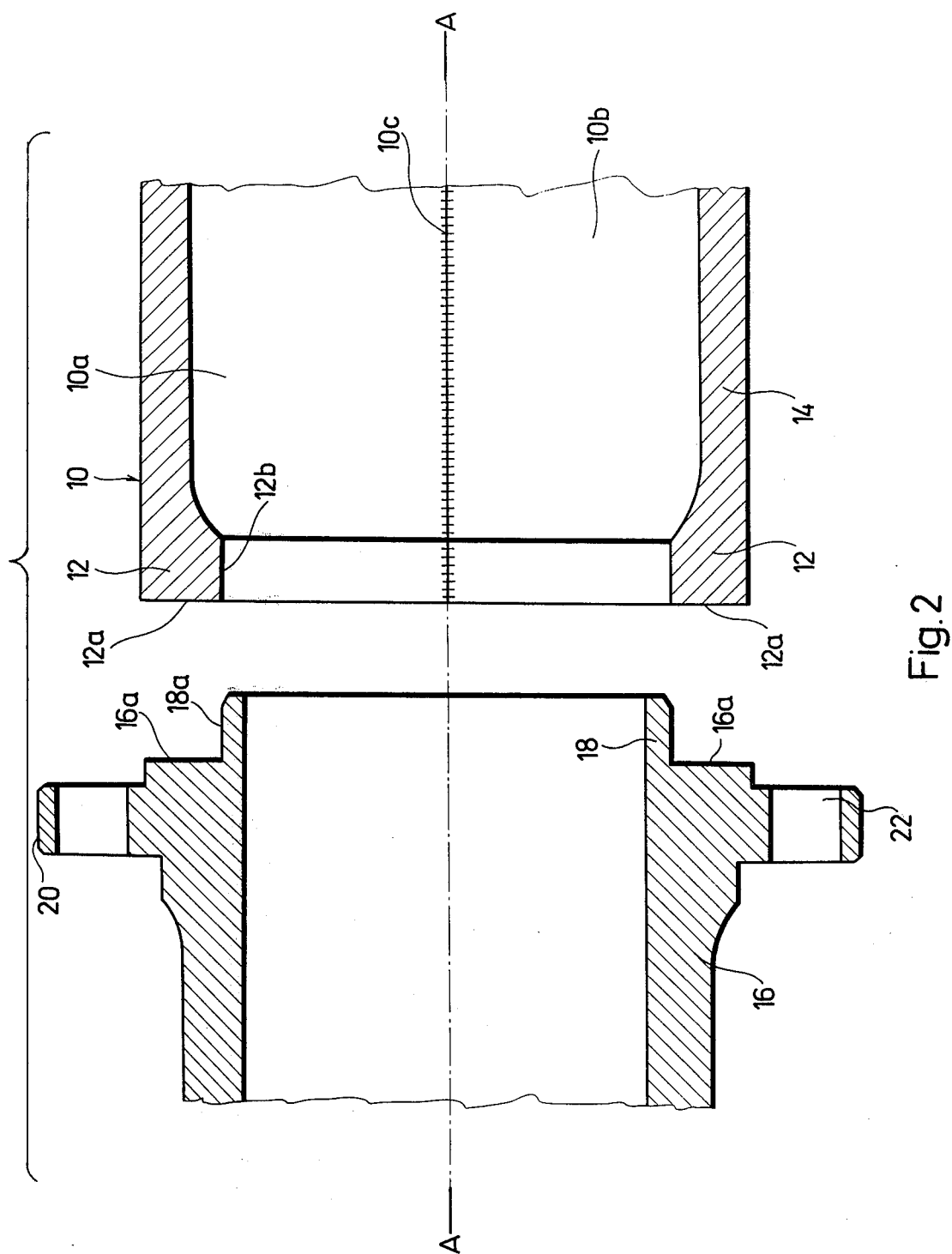
FIG. 2 shows the encircled part II of FIG. 1 on an enlarged scale, the parts connected to one another in FIG. 1 being illustrated here in mutually separated positions.

In the drawings, an axle housing 10 consists of two halves 10a and 10b which are welded together along a plane A — A in a manner known per se which is at a right angle with respect to the plane of the drawing. At its free edge the axle housing 10 has a circumferential beading or upset portion 12. If the axle housing 10 consists e.g. of sheet metal 14, the beading 12 may be obtained by plastic deformation, e.g. by upsetting the sheet metal 14 after welding has been carried out along the plane A — A.

The front end surface 12a of the axle housing 10 and the surface of an opening or passage 12b in the beading 12 as well as other parts of the axle housing 10 will be machined as required. The circumferential beading 12 permits to obtain a suitably large abutting face for connecting the axle housing 10 with hollow axles by means of welding.

Reference character 16 refers to a hollow axle the front end surface facing the axle housing 10 of which is machined so that in addition to an annular abutting face 16a which corresponds to the front end surface 12a of the axle housing also a fitting flange 18 is obtained which, in assembled position, lies against the wall of the passage or opening 12b in the beading 12 of the axle housing 10. A flange 20 serves for receiving a brake in a conventional manner.

In operation, both mutually equal halves 10a and 10b of the axle housing 10 will be made of sheet metal 14 by means of punching and pressing. Then, both halves 10a and 10b are laid one against the other along the plane A — A and connected by means of welding as is suggested at 10c. The free end edges of the axle housing 10 will be upset in such a manner that the beadings 12 are obtained and, thereby, the thickness of the edges is increased by about 15 millimeters.

Thereafter, the axle housing 10 is machined, whereby the front surface 12a and the passage or opening 12b of the circumferential beading 12 receive their final finish. The thickness of the beading 12 is decreased to about 12 millimeters thereby. An opening or passage 10d for receiving a differential drive not shown is machined in a similar manner. Herewith, the axle housing 10 is finished and prepared for having the hollow axles 16 connected to it by means of welding.

The hollow axles 16 will be finished in a conventional manner. Surfaces 18a of the fitting flange 18 and abutting faces 16a of the hollow axles 16 obtain their final sizes and surface qualities. The flanges 20 have bores 22 machined in them for fixing a brake equipment, likewise not shown. The free extremities of the hollow axles 16 are provided with external threads 24 for being connected to axle drives.

Then, the hollow axles 16 will be pushed from both sides into the axle housing 10 in such a manner that their abutting faces 16a lie against the front end surfaces 12a of the beadings 12. Concentric positions of hollow axles 16 and axle housing 10 are ensured by the surfaces 18a of the fitting flanges 18 lying against the walls of passages or openings 12b of the beadings 12. Such assembled position is represented in FIG. 1.

The assembly of axle housing 10 and hollow axles 16 will be clamped and electron beam welding will be carried out along the front end surface 12a in a conventional manner.

Then, the axle housing 10 with its hollow axles 16 is ready for use.

It has been ascertained on the basis of experiments that the welded connection along the front end surfaces 12a completely satisfies all requirements which axle housings and hollow axles have to meet. On the one hand, the front end surface 12a of the beadings 12 obtained by upsetting the sheet metal 14 is sufficiently large for a suitable abutment face for welding purposes and for a passage or opening 12b for receiving the fitting flanges 18 of associated hollow axles 16. On the other hand, the welded areas show no structural changes whatever which could entail fatigue cracks. This is obviously due to the employment of electron beam welding. Thus, it will be appreciated that axle housings with hollow axles prepared by the method according to the invention have proven to be equivalent to heavy bolted structures as regards their constructional strength, while with respect to their light weight and small space requirements they may be considered as light constructions.

Hereinbefore the method according to the invention has, by way of example, been described in connection with preparing an axle housing made of sheet metal. It will, however, be apparent that the invention might be employed with other work materials as well since it is not absolutely necessary to obtain the beading by plastic deformation such as upsetting. Other methods, e.g. casting might be employed as well.

What we claim is:

1. In a method of manufacturing axle housings of sheet metal with hollow axles, the steps of:
    forming a beaded edge on each side of a sheet metal axle housing by means of plastic deformation;
    machining both the axle housing and the hollow axles so as to have mutually abutting front surfaces;
    fitting the hollow axles each in one of the beaded edges of the axle housing along said mutually abutting front surfaces;
    clamping the axle housing with the fitted in hollow axles in a clamping device;
    and connecting the hollow axles with the axle housing along said mutually abutting front surfaces by means of electron beam welding.

* * * * *